United States Patent
Liu

(10) Patent No.: US 11,614,981 B2
(45) Date of Patent: Mar. 28, 2023

(54) HANDLING OF METADATA FOR MICROSERVICES PROCESSING

(71) Applicant: SAP SE, Walldorf (DE)

(72) Inventor: Yingqiao Liu, Shanghai (CN)

(73) Assignee: SAP SE, Walldorf (DE)

( * ) Notice: Subject to any disclaimer, the term of this patent is extended or adjusted under 35 U.S.C. 154(b) by 99 days.

(21) Appl. No.: 17/077,738

(22) Filed: Oct. 22, 2020

(65) Prior Publication Data

US 2022/0129332 A1  Apr. 28, 2022

(51) Int. Cl.
*G06F 9/54* (2006.01)
*G06F 16/21* (2019.01)

(52) U.S. Cl.
CPC ............ *G06F 9/546* (2013.01); *G06F 16/219* (2019.01)

(58) Field of Classification Search
CPC .............................. G06F 9/546; G06F 16/219
See application file for complete search history.

(56) References Cited

U.S. PATENT DOCUMENTS

| | | | | |
|---|---|---|---|---|
| 2004/0215744 A1* | 10/2004 | Motoyama | ............... | H04L 67/34 709/217 |
| 2008/0109298 A1* | 5/2008 | Barton | ............... | H04N 21/2547 705/7.29 |
| 2009/0306920 A1* | 12/2009 | Zwinger | ............ | G01R 31/2884 324/750.01 |
| 2010/0299703 A1* | 11/2010 | Altman | .................. | H04H 60/04 709/204 |
| 2014/0101299 A1* | 4/2014 | Cherel | ..................... | G06F 9/468 709/223 |
| 2014/0282422 A1* | 9/2014 | Tuffs | .................... | G06F 11/3428 717/127 |
| 2014/0379901 A1* | 12/2014 | Tseitlin | ............... | H04L 41/5096 709/224 |
| 2015/0040229 A1* | 2/2015 | Chan | ..................... | G06F 21/577 726/25 |
| 2015/0358259 A1* | 12/2015 | Sterns | ..................... | H04L 51/36 709/206 |
| 2016/0239861 A1* | 8/2016 | Hage | .................. | G06Q 30/0233 |
| 2017/0300706 A1* | 10/2017 | Jassal | ..................... | G06F 16/183 |
| 2018/0089258 A1* | 3/2018 | Bhattacharjee | ... | G06F 16/24535 |
| 2018/0095952 A1* | 4/2018 | Rehal | .................... | G06F 16/213 |

(Continued)

*Primary Examiner* — Tuan C Dao

(74) *Attorney, Agent, or Firm* — Fountainhead Law Group P.C.

(57) ABSTRACT

Embodiments facilitate efficient and flexible handling of metadata for processing in a microservice architecture (MSA) environment. A consumer service and a provider service both utilize a data model having metadata. A central repository stores metadata information that is being called for by a consumer service. A dedicated meta service manages the metadata repository by listening to a message queue to obtain model-relevant metadata information from a provider service. That model-relevant metadata information may be static in nature, or may be dynamic (e.g., varying as between different tenants). The meta service recognizes the static/dynamic nature of the model-relevant metadata information (e.g., based upon content such as a tenant ID or other information) in a message from the provider service, and stores the metadata accordingly. Once stored in the central repository, the model-relevant metadata information may be communicated directly to the consumer service.

20 Claims, 11 Drawing Sheets

(56) References Cited

U.S. PATENT DOCUMENTS

| | | | |
|---|---|---|---|
| 2018/0288148 A1* | 10/2018 | Dhanapal | H04L 67/1097 |
| 2019/0243547 A1* | 8/2019 | Duggal | G06F 3/0619 |
| 2019/0262719 A1* | 8/2019 | Wang | A63F 13/795 |
| 2020/0160050 A1* | 5/2020 | Bhotika | G06V 30/414 |

* cited by examiner

```
<hris-element id="salesorder">
    <label xml:lang="en-US">Sales Order</label>
    <hris-field max-length="32" id="bp-code" visibility="both">
        <label xml:lang="en-US">Business Partner Name </label>
    </hris-field>
    <hris-field max-length="100" id="bp-name" visibility="both" required="true">
        <trigger-rule event="onChange" rule="SetBusPhone1"/>
        <trigger-rule event="onChange" rule="SetNonBusPhone"/>
        <label xml:lang="en-US">Customer Name</label>
    </hris-field>
    <hris-field>.....</hris-field>
    ...
</hris-element>
```

FIG. 4

| TenantID | 419ef9e0380 |
|---|---|
| DataModel | `<hris-element id="salesorder">`<br>`<label xml:lang="en-US">Sales Order</label>`<br>`<hris-field max-length="32" id="bp-code" visibility="both">`<br>`<label xml:lang="en-US">Business Partner Name </label>`<br>`</hris-field>`<br>`<hris-field max-length="100" id="bp-name" visibility="both" required="true">`<br>`<trigger-rule event="onChange" rule="SetBusPhone1"/>`<br>`<trigger-rule event="onChange" rule="SetNonBusPhone"/>`<br>`<label xml:lang="en-US">Customer Name</label>`<br>`</hris-field>`<br>`<hris-field>......</hris-field>` |

FIG. 8

HANDLING OF METADATA FOR MICROSERVICES PROCESSING

BACKGROUND

Unless otherwise indicated herein, the approaches described in this section are not prior art to the claims in this application and are not admitted to be prior art by inclusion in this section.

The escalating complexity of computer systems that are increasingly being deployed across larger landscapes, offers both opportunities and challenges. One opportunity is the ability for multiple systems to leverage common processing resources and achieve greater efficiencies.

An example of such an approach is the enhanced use of microservices. Specifically, various different types of computer systems may each require a common procedure to be performed. As an example, more than one computer system resident in a given landscape, may share a common need for accurate national currency conversions.

Rather than expending the effort to monolithically provide such currency conversion in each separate system, a suite of related software may instead reference currency conversion as a common microservice. Such a microservice architecture (MSA) offers a number of benefits, including ready scalability to meet demands of multiple systems.

SUMMARY

Embodiments facilitate efficient and flexible handling of metadata for processing in a microservice architecture (MSA) environment. A consumer service and a provider service both utilize a data model having metadata. A central repository stores metadata information that is being called for by a consumer service. A dedicated meta service manages the metadata repository by listening to a message queue to obtain model-relevant metadata information from a provider service. That model-relevant metadata information may be static in nature, or may be dynamic (e.g., varying as between different tenants). The meta service recognizes the static/dynamic nature of the metadata based upon content (e.g., a tenant ID or other information) present in a message from the provider service, and stores the metadata accordingly. Once stored in the central repository, the model-relevant metadata information may be communicated directly to the consumer service.

The following detailed description and accompanying drawings provide a better understanding of the nature and advantages of various embodiments.

BRIEF DESCRIPTION OF THE DRAWINGS

FIG. 4 illustrates a snippet of an exemplary data model.

FIG. 8 shows an example data structure of a dynamic metadata information message.

DETAILED DESCRIPTION

Described herein are methods and apparatuses that implement handling of metadata for microservices handling. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
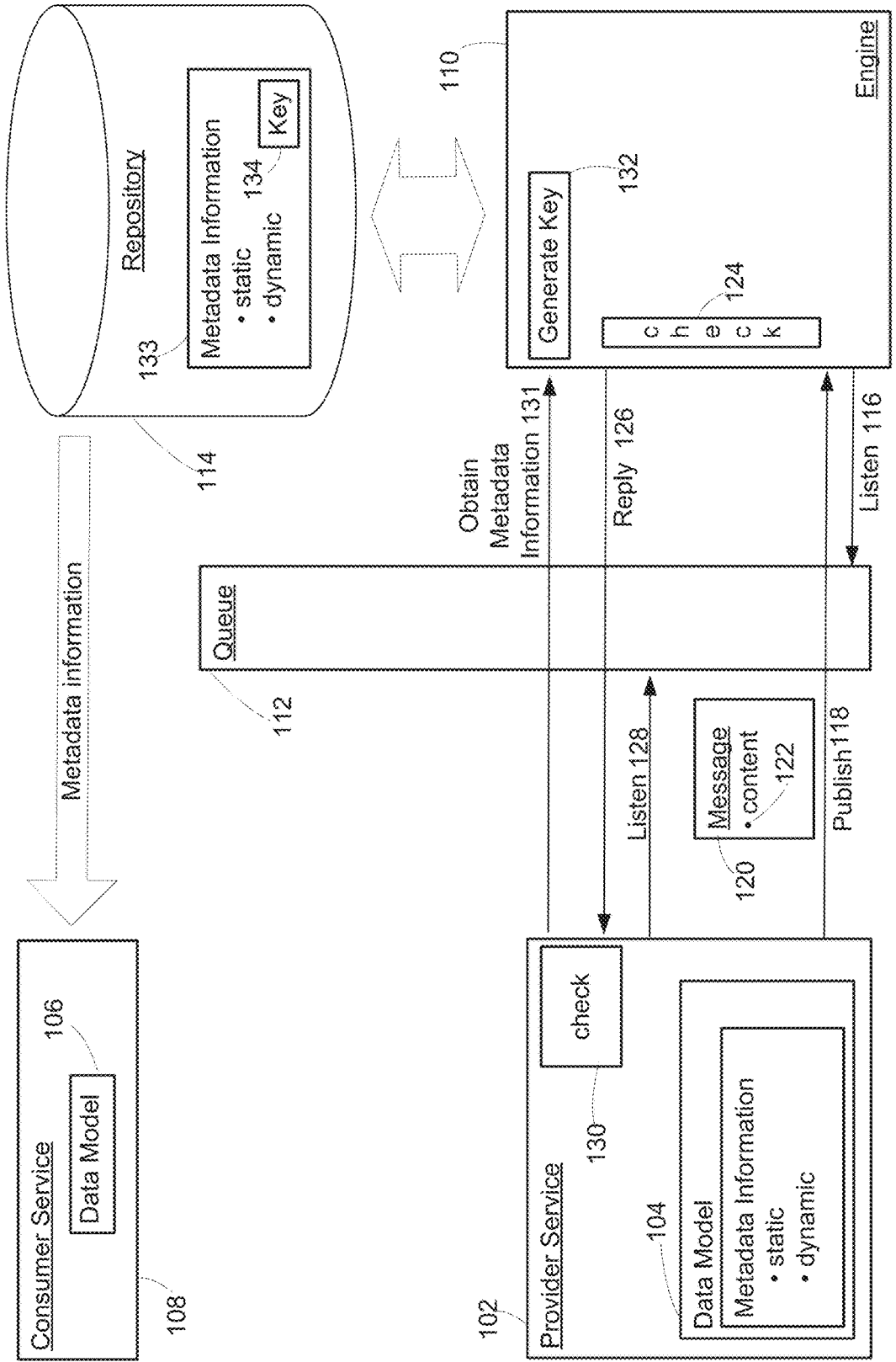
FIG. 1 shows a simplified diagram of a system according to an embodiment.

FIG. 1 shows a simplified view of an example system that is configured to implement metadata handling according to an embodiment. Specifically, system 100 comprises a provider service 102 that is configured to process a data model 104 in order to provide a useful output.

That output is consumed by the data model 106 of a consumer service 108. Under a MSA environment, a plurality of different consumer services may consume the output of a single provider service, thereby providing scalability and introducing operating efficiencies.

Embodiments provide a metadata processing engine 110 that is in communication with the provider service via a message queue 112. The processing engine is also in communication with a metadata repository 114.

In operation, the processing engine listens 116 to the message queue, to detect the publication 118 of a message 120. The message includes content 122, which may be subjected to a checking process 124 to determine that the metadata of the provider service is relevant to a particular data model and hence appropriate for storage in the repository. As disclosed in detail below, a portion of the content (e.g., a tenant identifier) may also be referenced by the processing engine to check whether the metadata information is static or dynamic in nature. As disclosed in detail below, a portion of the content (e.g., a version number) may also be referenced by the processing engine to check whether the metadata information the subject of a canary release scenario.

If the message received from the provider service passes the checking procedure, the processing engine publishes a reply 126 that indicates the provider service should in fact communicate the model-relevant metadata for storage in the repository.

The provider service is also listening 128 to the message queue. It receives the reply, and performs its own checking procedure 130 to determine whether the version and name match.

If the provider service checking procedure is successfully passed, the provider service then communicates the metadata information to the message queue. The processing engine obtains 131 the metadata information from the queue, and then performs a process 132 of generating a unique key, that is for reference in accessing the metadata stored within the repository. The key that is generated, may reveal the static vs. dynamic nature of the stored metadata. Further details regarding this aspect are provided in the example below.

Once the metadata information is stored in the repository as a key-value pair 133 including the corresponding key 134, it is then available for access by the consumer service to perform processing according to the data model. In certain embodiments, the key-value scheme of the repository, may afford the consumer service with direct access to the metadata stored in the repository, without the need for further action by the processing engine.

The embodiment of FIG. 1 is simplified, in that only a single provider service and a single consumer service are shown. In reality, however, the metadata processing engine may utilize the metadata repository and message queue(s) to flexibly and rapidly handle the communication of model-relevant metadata between multiple provider services and multiple consumer services.

The embodiment of FIG. 1 is simplified, in that only a single consumer service is shown. In reality however, the metadata processing engine may utilize the metadata repository and message queue(s) to flexibly and rapidly handle the communication of model-relevant metadata between a provider service and multiple consumer services (thereby achieving the desired efficiency and scalability properties available using MSAs).

Moreover, the embodiment of FIG. 1 is also simplified, in that only a single provider service is shown. In reality, the metadata processing engine may utilize a single metadata repository and message queue(s) to flexibly/rapidly handle the communication of model-relevant metadata of multiple provider services and corresponding consumer services.

Figure 2:
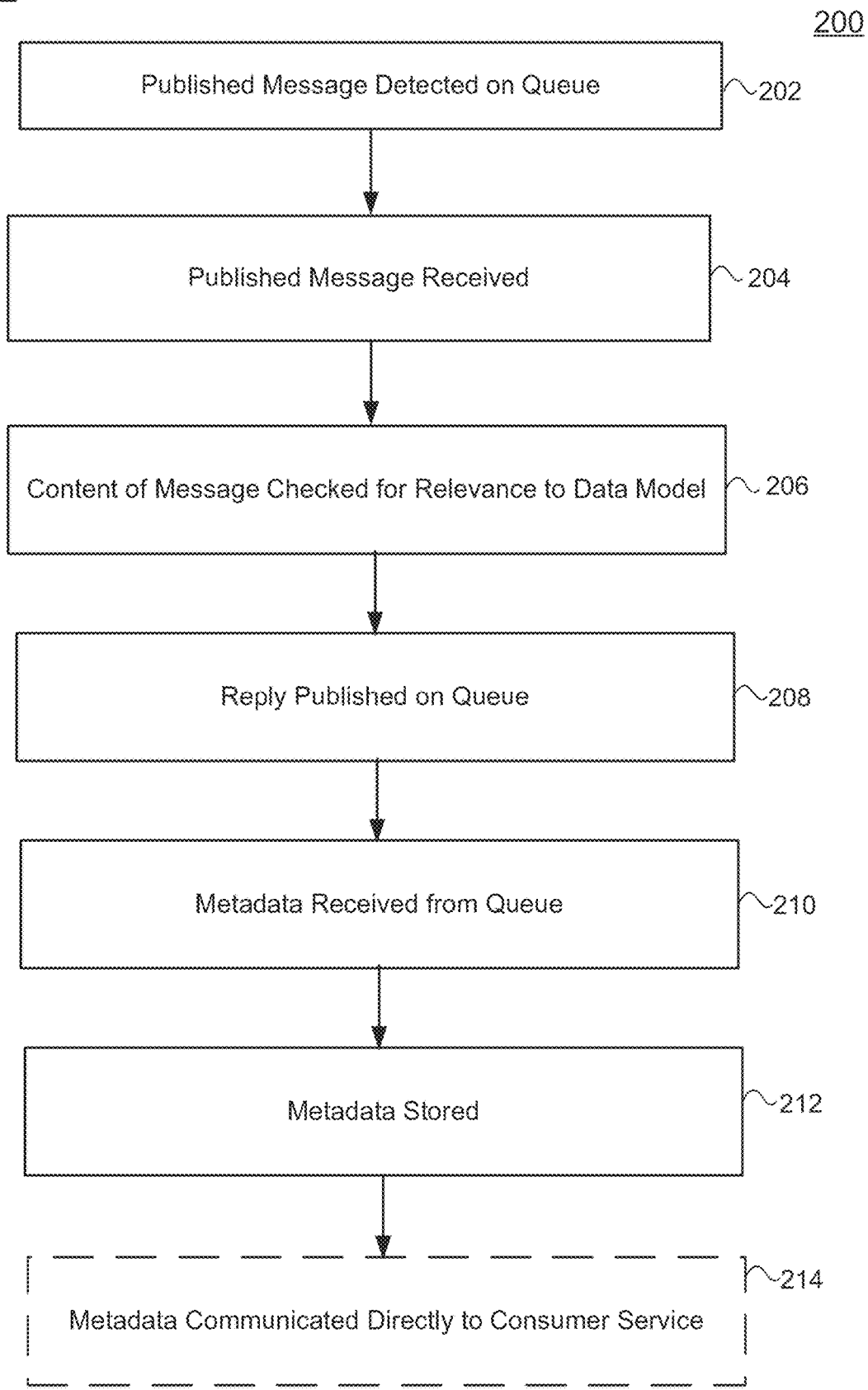
FIG. 2 shows a simplified flow diagram of a method according to an embodiment.

FIG. 2 is a flow diagram of a method 200 according to an embodiment. At 202, publication of a message on a message queue by a provider service, is detected.

At 204, the message is received from the message queue. The message includes content identifying metadata provided by the provider service.

At 206, the content is checked to determine if the metadata is relevant to a model. At 208, if the metadata is relevant to the model, a reply is published on the message queue.

At 210, in response to the reply, the metadata published by the provider service to the message queue, is received. At 212, the metadata is stored in a non-transitory computer readable storage medium.

At 214, the metadata may optionally be communicated directly to a consumer service.

Further details regarding microservices metadata handling according to embodiments, are now provided in connection with the following example.

EXAMPLE

Increasingly, software applications deployed in the cloud utilize a microservice architecture (MSA). Such applications can include but are not limited to Enterprise Resource Planning (ERP), Customer Service Management (CRM), Human eXperience Management (HXM), and others available from SAP SE of Walldorf, Germany.

In contrast to traditional monolithic architectures, MSA exhibits benefits such as scalability, ease of deployment, and system resilience. At same time, reliance upon MSA also may offer some technical challenges.

One such challenge is related to metadata information. For example, an ERP application may require certain (consumer) functions to receive as inputs, the outputs—including metadata information—of other (provider) services.

One concrete example of metadata information, is a data model of a Business Object (BO). Specifically, conferring a software user with the ability to dynamically change such a data model, results in complexity in effective handling of metadata.

Accordingly, embodiments handle metadata using a central repository to store metadata information called for by consumer services. A dedicated meta service manages the metadata repository to obtain relevant metadata information from provider services.

Figure 3:
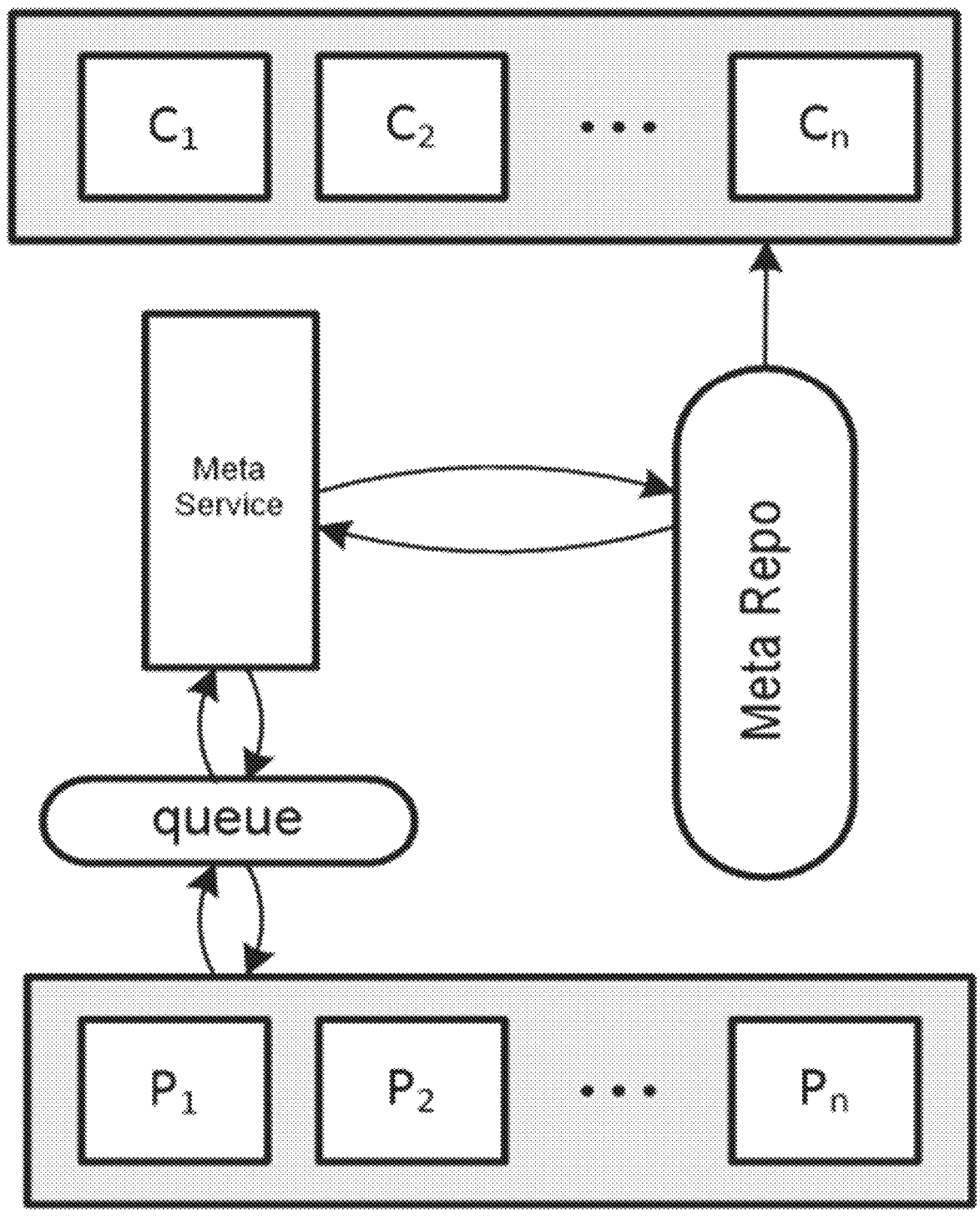
FIG. 3 is a simplified block diagram of a system configured to implement metadata handling according to an exemplary embodiment.

FIG. 3 shows a simplified block diagram of a system 300 configured to implement metadata handling according to an exemplary embodiment. Specifically, in related applications like ERP, CRM and HXM, there are two categories of metadata information.

One category is static metadata information. Static metadata is the same across different tenants. Static metadata is changed when a service upgrades to new version.

The other category is dynamic metadata information. This dynamic metadata information can be overridden by the end user, and can alter static metadata through extensibility. Dynamic metadata may be specified by a tenant, and that dynamic metadata changes as between different tenants.

Consider a 'sales order' as one example data model. FIG. 4 illustrates a snippet of such a data model.

There is a property default named "Business Partner Name". This is not a required property, and hence can be kept empty.

The sales order can be changed through extensibility for a specific tenant. In particular, the sales order can be customized to "Customer Name" and become a required property in an online store tenant.

Here, the consumer service will receive "Customer Name" and 'required' from an online store tenant. The consumer service will receive "Business Partner Name" and not 'required', for other tenants which do not override this property.

The obtaining static metadata information is now discussed. As stated above, the static metadata information is the same across different tenants and may be changed after service upgrade. Considering the characteristics of a MSA environment, at least the following challenges are present.

1. Many services may exist in a MSA. The number of services can be changed, new services can be added, and one service can be split into multiple services in a future version. So, it can be difficult to maintain metadata information and service relationships on the consumer system side.

2. In MSA, services can scale out easily based upon system load. Thus, there may be multiple service instances for any one service.

3. Under some circumstances, a service may be the subject of limited release as a way of evaluating its worthiness. Such limited release is referred to herein as a canary release. Accordingly, under such a canary release there may exist multiple versions for any one service.

Figure 5:
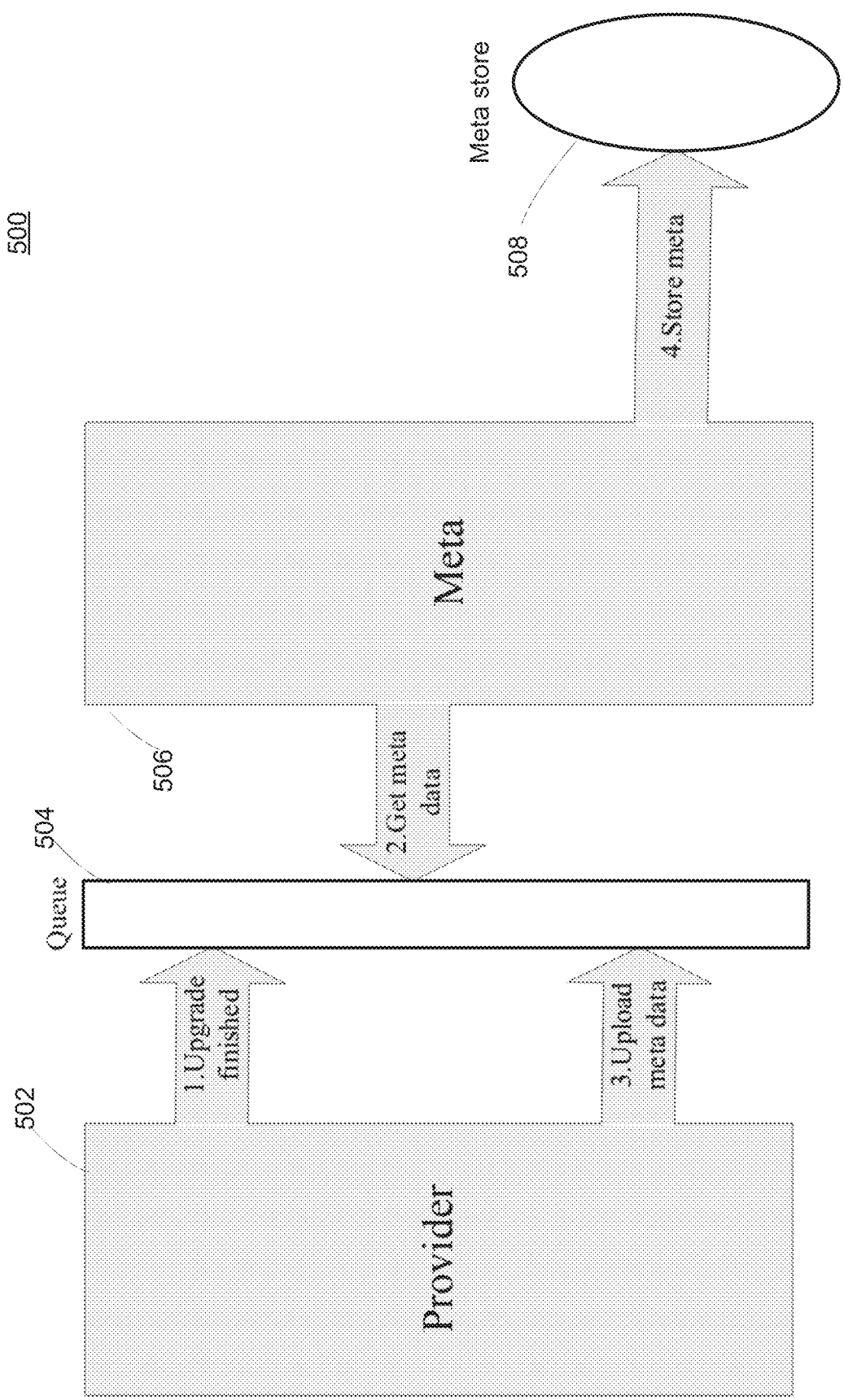
FIG. 5 is a simplified diagram describing the process flow between various components of the exemplary system FIG. 6 provides details of the actions taken by the provider service.

In order to address these issues, embodiments implement a 'producer-consumer' pattern together with a message queue, in order to obtain the metadata information of a provider service in an asynchronous manner FIG. 5 is a simplified diagram describing the process flow 500 between these various components.

As shown in FIG. 5, when the provider service 502 initializes or an upgrade is finished, the provider service will publish a message to the message queue 504 to notify other services. A sample message format is given below (taking a 'Shipping' service as example):

| Source Service Name | Shipping |
|---|---|
| Version | I3b74253 |
| Event Type | Upgrade Finished |

In this particular example, 'Source Service Name' field is the name of provide service. The 'Version' field indicates the source service's version, which typically is hash code of git commit id.

The meta service 506 listens to the message queue. The meta service receives the message and checks whether it has already stored the same service and same version's metadata information.

If the answer is yes, the meta service will ignore this message and do nothing. If the answer is no, the meta service will send a message asking the provider service to push this version's metadata to the message queue. An exemplary message format is given below.

| Source Service name | Meta |
|---|---|
| Dest. Service name | Shipping |
| Dest. Version | I3b74253 |
| Event Type | Get Metadata |

The provider service listens to the message queue, and receives the message generated. First, the provider service checks the name and version in the message to determine whether it matches its owner service and version.

Figure 6:
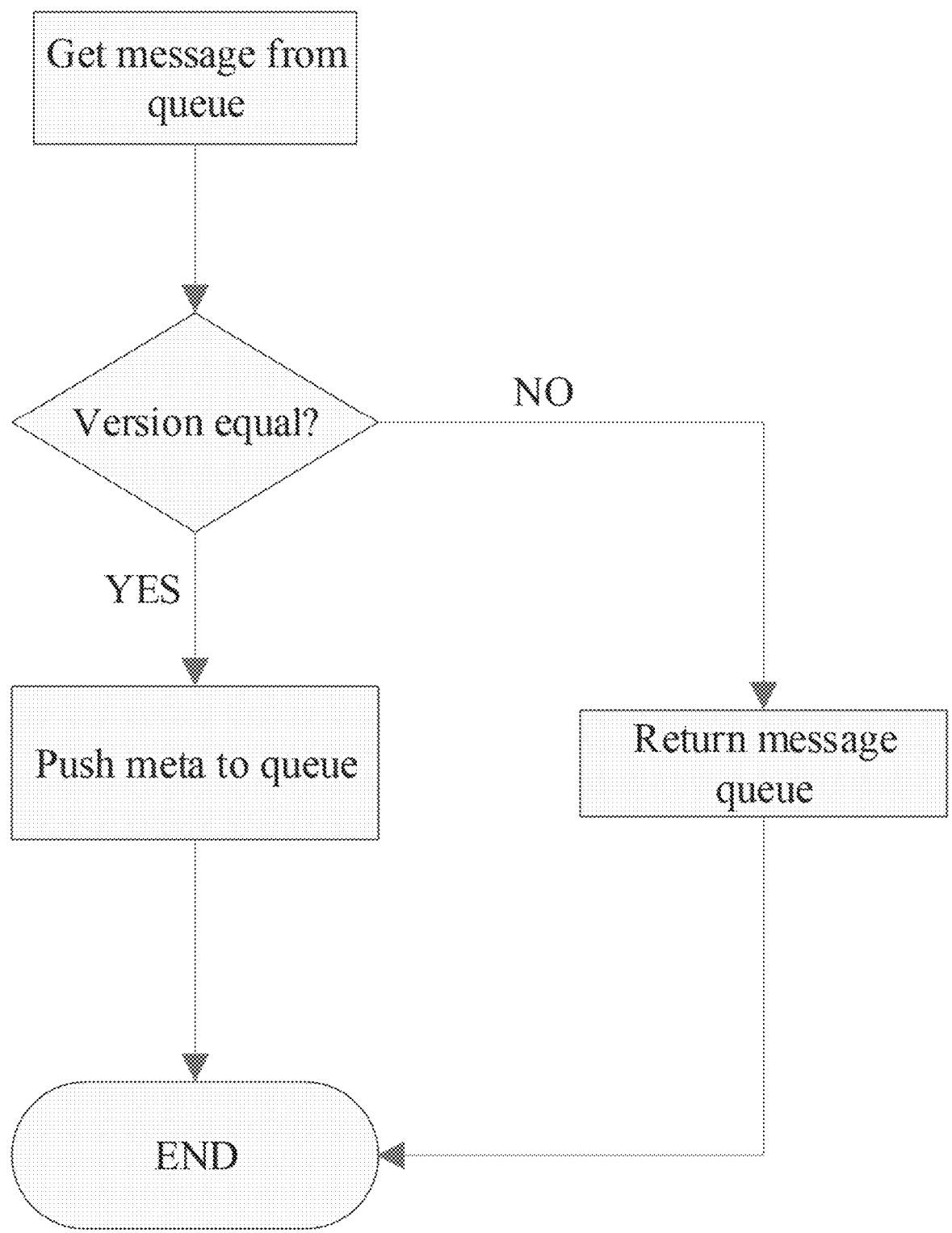

If the answer is no, the provider service will do nothing. If the answer is yes, the provider service will send metadata information via the message queue. Details of these actions taken by the provider service are summarized in the simplified diagram in FIG. 6.

In a canary release, there may several versions for the same service. Accordingly, embodiments check service and message version to ensure that the correct version's metadata information is obtained. An example data structure is given below.

| Source Service name | Shipping |
|---|---|
| Service Version | I3b74253 |
| Metadata Body | <hris-element id="salesorder"><br>......<br></hris-element> |

The meta service receives the message, and stores metadata information to the meta store 508. The metadata repository operates in a manner similar to a database.

Specifically, the meta service considers performance and the data structure of metadata information. In this particular example, an in-memory no SQL database (e.g., the REDIS database) may be used as the meta store.

The manner by which this example obtains dynamically changing metadata information, is now discussed. As mentioned above the ability to extend a data model by the use of customized metadata, may be an important property for software such as ERP, CRM and/or HXM.

The ability to change metadata information in a dynamic manner, is one requirement for extensibility. In an example, a user can change the properties' label and visibility for of a data object—e.g., a Business Object (BO) in order to suit a particular need.

However, such changes are not universal, but rather tenant specific. That is, a different tenant may have different (or no) customizations of model-relevant metadata information.

Figure 7:
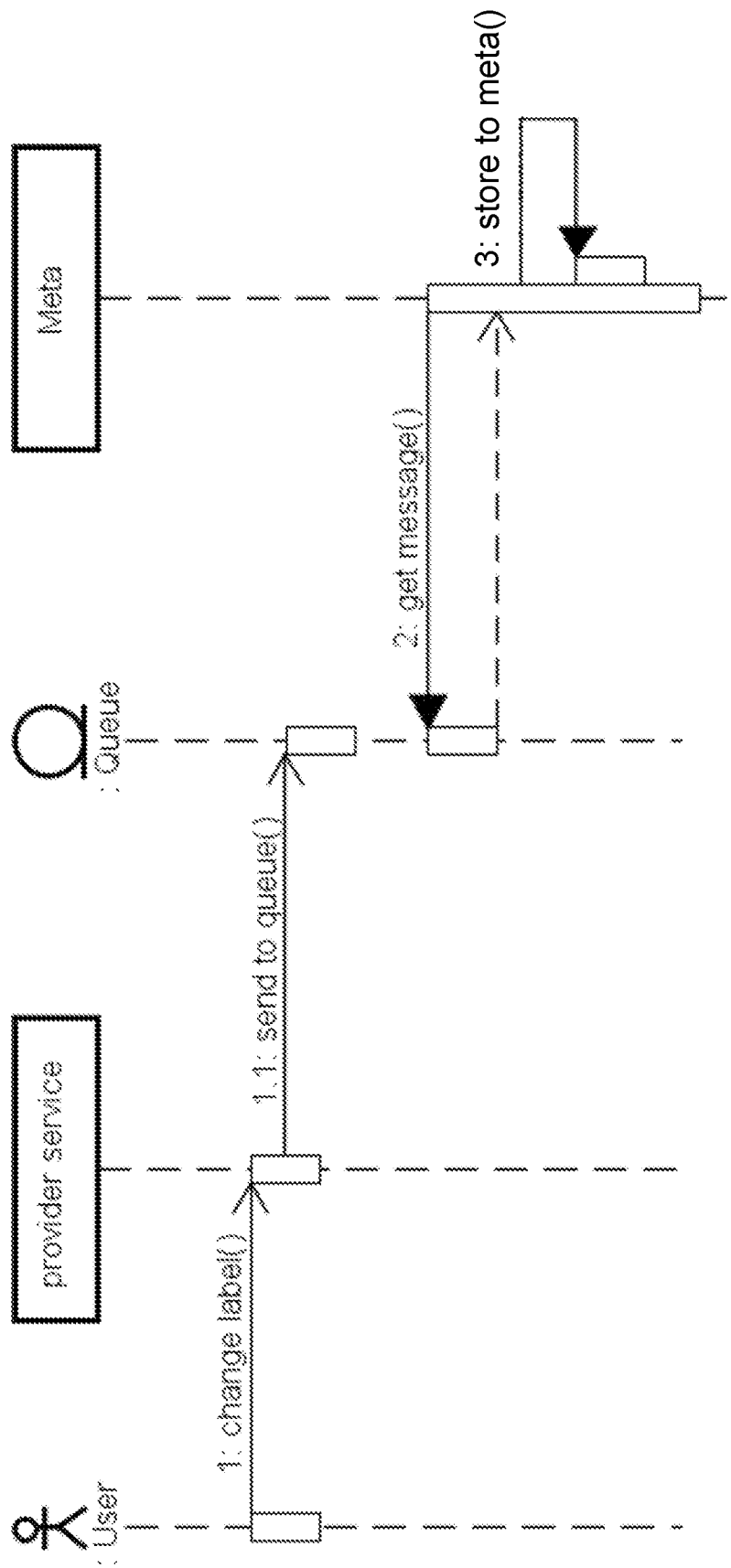
FIG. 7 is a simplified diagram showing the process of capturing of a change of dynamic metadata information.

When a user changes metadata information dynamically, the provider service also pushes a message to the queue. The meta service listens to the queue to capture such a change, and stores the change into the meta store. FIG. 7 is a simplified diagram showing this process. Here, a user has dynamically changed the model-relevant metadata label ( ) in the provider service.

The example data structure of a dynamic metadata information message is shown in FIG. 8. This message includes a tenant identifier (TenantID) having a specific value (419ef9e0380) which can be referenced to determine the dynamic nature of the model-relevant metadata.

The properties of the meta store and its ability to retrieve metadata information, is now discussed. Specifically, as described above the meta service collects metadata information and stores that information in the meta store (e.g., an in-memory database).

To improve performance and reliability, consumer services may retrieve metadata information communicated directly from the meta store. This is because the meta store may be a basic infrastructure component for modern cloud platforms—e.g. the REDIS database in Amazon Web Services (AWS). In such embodiments the meta store may be more reliable and stable than normal services. Meanwhile the cost of maintenance may also be low.

As noted above, metadata information is present in both dynamic and static forms. The consumer service needs to check both kinds of metadata information.

The dynamic metadata information may be afforded a high priority, and may override static metadata information for a same property. Returning to the exemplary sales order model of FIG. 4 and FIG. 8, one particular tenant (tenant A, id=419ef9e0380) may changes 'Sales Order's property 'Business Partner Name's label to 'Customer Name'.

When the consumer service gets tenant A's metadata information about this property, it will return 'Customer Name'. For other tenants however, the consumer service will return 'Business Partner Name'.

The data structure of the metadata information is a key-value pair. The key for static meta information and dynamic meta information are different. This is because the dynamic metadata information is tenant specific, while the static metadata information is not.

Figure 9:
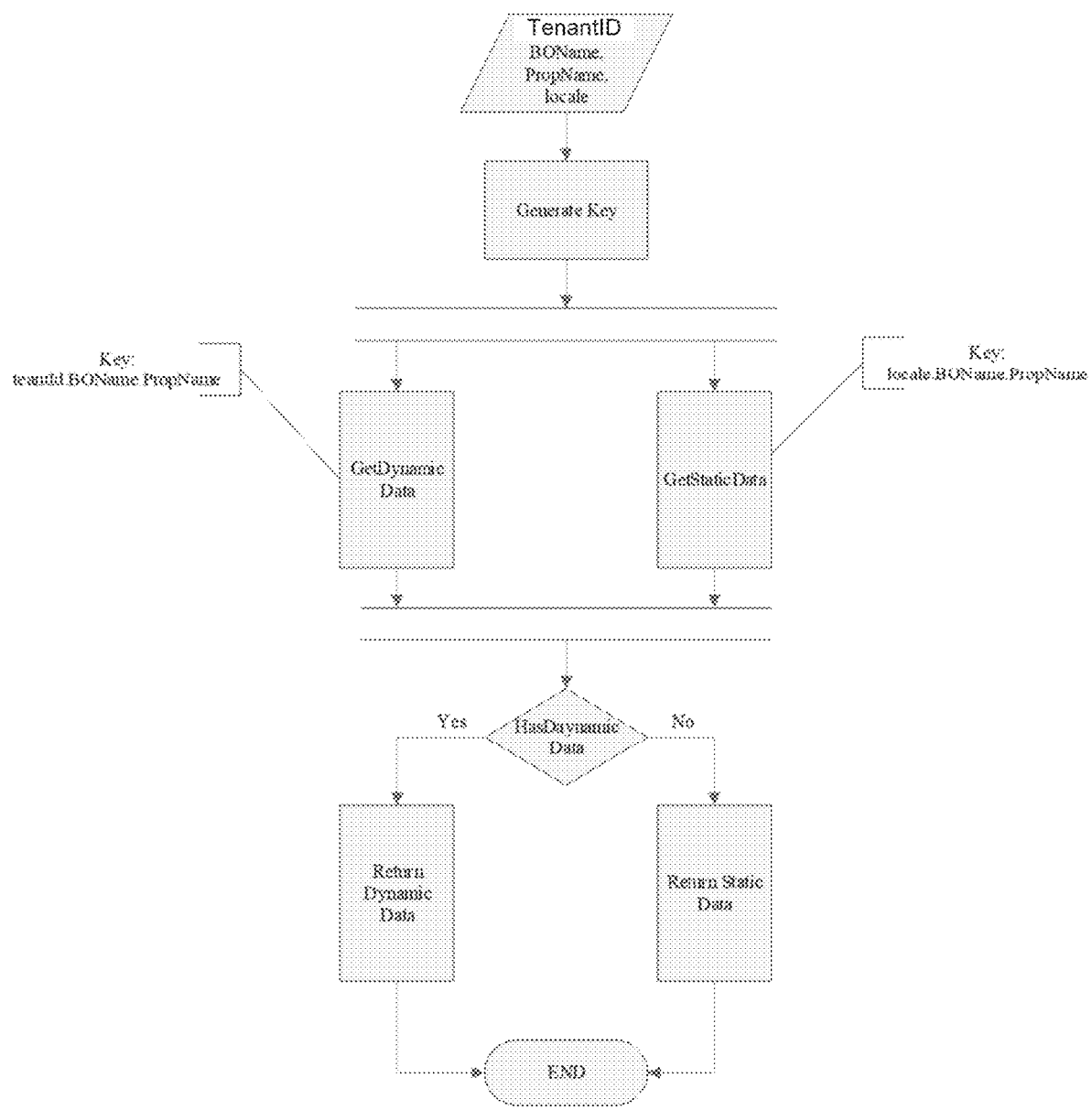
FIG. 9 shows an overview of a procedure to obtain metadata information.

A procedure 900 to obtain metadata information is shown in FIG. 9. In this particular example, the incoming metadata message includes the following:

TenantID—an identifier of a specific tenant;
BOName—the data model name (e.g., Business Object—BO) to which the metadata is relevant;
PropName—the name of the property in the data model to which the metadata is relevant;
locale—a geographic region to which the metadata is relevant.

Based upon this incoming information, FIG. 9 shows the use of different keys for storage of static and dynamic metadata information in the repository.

Embodiments as described herein may offer certain benefits over conventional metadata information handling approaches. For example, a traditional way of handling metadata information is for a consumer service to directly call the API of a provider service to obtain data models in a synchronous manner.

However, where the provider service popular and/or resource-constrained, this may result in a performance penalty for the provider service, which must respond to the call. Such tight coupling between provider and consumer services can run counter to the desired objectives of flexibility and scalability for MSA approaches.

Another possible benefit that may be offered by embodiments, is improved efficiency and speed. That is, tightly-coupled synchronous handling of provider service dictionaries, can introduce unwanted delays in MSA processing.

Returning now to FIG. 1, there the particular embodiment is depicted with the engine responsible for metadata management as being located outside of the metadata store. However, this is not required.

Rather, alternative embodiments could leverage the processing power of an in-memory database engine (e.g., the in-memory database engine of the HANA in-memory database available from SAP SE), in order to perform various functions.

Figure 10:
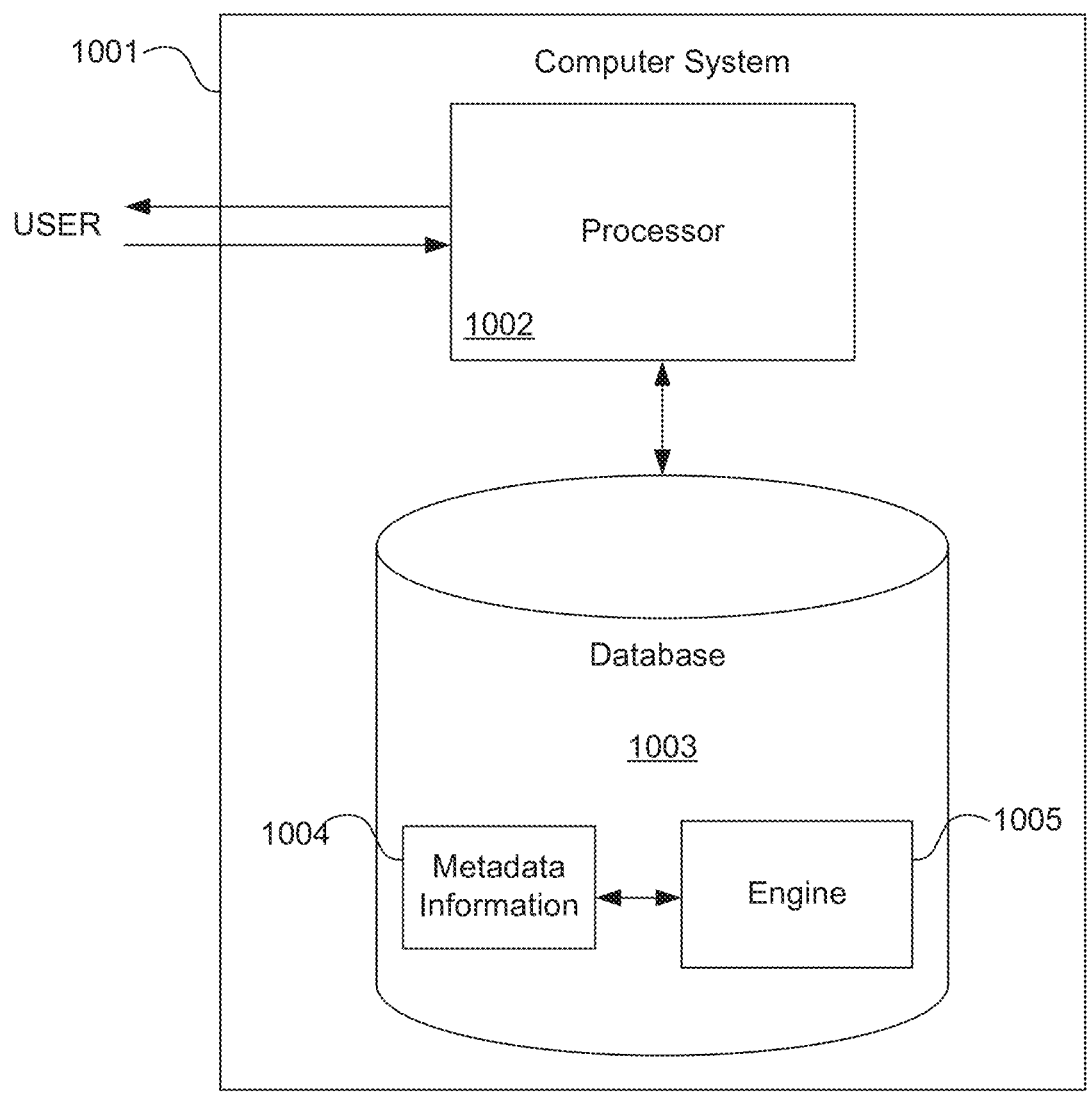
FIG. 10 illustrates hardware of a special purpose computing machine according to an embodiment that is configured to implement handling of metadata.

Thus FIG. 10 illustrates hardware of a special purpose computing machine configured to implement handling of microservices metadata according to an embodiment. In particular, computer system 1001 comprises a processor 1002 that is in electronic communication with a non-transitory computer-readable storage medium comprising a database 1003. This computer-readable storage medium has stored thereon code 1005 corresponding to an engine. Code 1004 corresponds to stored metadata information. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 11:
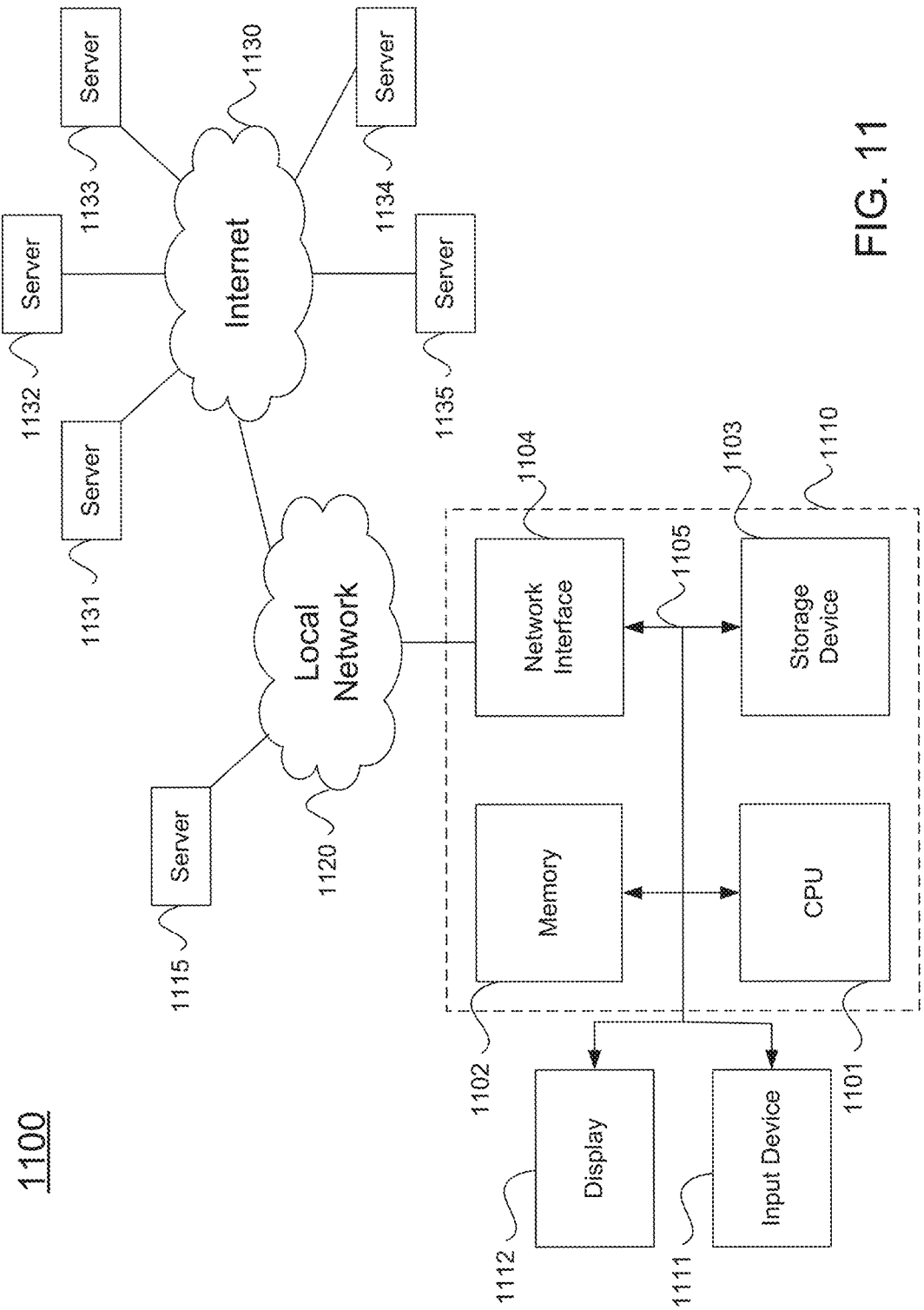
FIG. 11 illustrates an example computer system.

An example computer system 1100 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 610 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A method comprising:
 detecting on a message queue, publication of a message by a provider service, the message including content identifying metadata provided by the provider service;
 receiving the message from the message queue;
 based on high-speed, scalable access to a central repository storing centralized metadata from provider services containing information called for by consuming microservices, checking the content to determine if the metadata is relevant to a model;
 in response to dynamically determining that the metadata is relevant to the model, publishing a reply on the message queue;
 in response to the reply, receiving from the message queue, the metadata published by the provider service; and
 storing the metadata in a non-transitory computer readable storage medium,
 wherein:
  the metadata is dynamic in nature,
  the content indicates a version, and
  the checking comprises matching the version, and
 wherein the version indicates a canary release.

2. A method as in claim 1 wherein the content comprises a name of the model.

3. A method as in claim 1 wherein the content comprises an identifier.

4. A method as in claim 3 wherein the content comprises a tenant identifier.

5. A method as in claim 1 wherein the content indicates the metadata to be dynamic in nature.

6. A method as in claim 5 wherein:
the metadata is stored with a key; and
the key differentiates the metadata from other metadata that is static in nature.

7. A method as in claim 1 wherein:
the non-transitory computer readable storage medium comprises an in-memory database; and
the checking is performed by an in-memory database engine of the in-memory database.

8. A method as in claim 1, wherein metadata information stored in a central repository is dynamically changed by a user.

9. A method as in claim 1, wherein the centralized metadata store is directly accessible to consumer services.

10. A non-transitory computer readable storage medium embodying a computer program for performing a method, said method comprising:
detecting on a message queue, publication of a message by a provider service, the message including an identifier identifying metadata provided by the provider service;
receiving the message from the message queue;
based on high-speed, scalable access to a central repository storing centralized metadata from provider services containing information called for by consuming microservices, checking the identifier to determine if the metadata is relevant to a model;
in response to dynamically determining that the metadata is relevant to the model, publishing a reply on the message queue;
in response to the reply, receiving from the message queue, the metadata published by the provider service; and
storing the metadata in a database of the non-transitory computer readable storage medium,
wherein:
the metadata is dynamic in nature,
the message indicates a version,
the checking comprises matching the version, and
wherein the version indicates a canary release.

11. A non-transitory computer readable storage medium as in claim 10 wherein the identifier is a tenant identifier.

12. A non-transitory computer readable storage medium as in claim 11 wherein the tenant identifier indicates the metadata to be dynamic in nature.

13. A non-transitory computer readable storage medium as in claim 12 wherein:
the metadata is stored with a key; and
the key differentiates the metadata from other metadata that is static in nature.

14. A non-transitory computer readable storage medium as in claim 10, wherein metadata information stored in a central repository is dynamically changed by a user.

15. A computer system comprising:
one or more processors;
a software program, executable on said computer system, the software program configured to cause an in-memory database engine of an in-memory source database to:
detect on a message queue, publication of a message by a provider service, the message including content identifying metadata provided by the provider service;
receive the message from the message queue;
based on high-speed, scalable access to a central repository storing centralized metadata from provider services containing information called for by consuming microservices, check the content to determine if the metadata is relevant to a model;
in response to dynamically determining that the metadata is relevant to the model, publish a reply on the message queue;
in response to the reply, receive from the message queue, the metadata published by the provider service; and
store the metadata in the in-memory database,
wherein,
the metadata is dynamic in nature,
the content indicates a version,
the check comprises matching the version, and
wherein the version indicates a canary release.

16. A computer system as in claim 15 wherein the content comprises an identifier.

17. A computer system as in claim 16 wherein the identifier is a tenant identifier.

18. A computer system as in claim 15 wherein the content indicates the metadata to be dynamic in nature.

19. A computer system as in claim 18 wherein:
the metadata is stored with a key; and
the key differentiates the metadata from other metadata that is static in nature.

20. A computer system as in claim 15, wherein metadata information stored in a central repository can be dynamically changed by a user.

* * * * *